United States Patent
Mader et al.

(10) Patent No.: US 8,758,532 B2
(45) Date of Patent: Jun. 24, 2014

(54) DEVICE AND METHOD FOR APPLYING SPACER TAPES TO GLASS PANES

(75) Inventors: Leopold Mader, Neuhofen/Ybbs (AT); Leopold Karner, Krummnussbaum (AT)

(73) Assignee: INOVA Lisec Technologiezentrum GmbH, Seitenstetten (AU)

( * ) Notice: Subject to any disclaimer, the term of this patent is extended or adjusted under 35 U.S.C. 154(b) by 288 days.

(21) Appl. No.: 13/144,781

(22) PCT Filed: Oct. 21, 2010

(86) PCT No.: PCT/AT2010/000401
§ 371 (c)(1),
(2), (4) Date: Sep. 27, 2011

(87) PCT Pub. No.: WO2011/047402
PCT Pub. Date: Apr. 28, 2011

(65) Prior Publication Data
US 2012/0037293 A1     Feb. 16, 2012

(30) Foreign Application Priority Data
Oct. 22, 2009 (AT) ................................. A 1664/2009

(51) Int. Cl.
| | |
|---|---|
| B32B 41/00 | (2006.01) |
| E06B 3/673 | (2006.01) |
| B65H 37/00 | (2006.01) |
| B29C 63/00 | (2006.01) |

(52) U.S. Cl.
CPC ........... E06B 3/6733 (2013.01); E06B 3/67304 (2013.01); E06B 3/67326 (2013.01); E06B 3/67382 (2013.01); B65H 37/002 (2013.01); B29C 63/0026 (2013.01)
USPC ............... 156/64; 156/99; 156/107; 156/109; 156/351; 156/361; 156/378; 156/379; 156/381; 156/580

(58) Field of Classification Search
CPC .............. E06B 3/6733; E06B 3/67304; E06B 3/67326; E06B 3/67382; B65H 37/002; B29C 63/0026
USPC ............ 156/64, 99, 107, 109, 351, 361, 378, 156/379, 381, 580
See application file for complete search history.

(56) References Cited

U.S. PATENT DOCUMENTS

| | | |
|---|---|---|
| 3,876,489 A | 4/1975 | Chenel |
| 5,413,156 A | 5/1995 | Lisec |

(Continued)

FOREIGN PATENT DOCUMENTS

| | | |
|---|---|---|
| DE | 2363300 A1 | 6/1974 |
| DE | 30 02 904 A1 | 8/1980 |

(Continued)

OTHER PUBLICATIONS

International Search Report, dated Feb. 16, 2011, from corresponding PCT application.

(Continued)

Primary Examiner — Katarzyna Wyrozebski Lee
Assistant Examiner — Joshel Rivera
(74) Attorney, Agent, or Firm — Young & Thompson

(57) ABSTRACT

An device for simultaneous application of elastoplastic spacer tapes to two glass panes with identical outline shape and identical dimensions has two application heads (107) that can be adjusted essentially vertically up and down on linear axles (105). The application heads (107) are moved synchronously, likewise the two glass panes by the holding devices that are assigned to them and that move the glass panes in a direction that is perpendicular to the direction of motion of the application heads (107). Thus, it is sufficient to measure a single glass pane of a triple insulating glass element, and both application panes of the insulating glass element can be covered at the same time with spacer tapes, so that time is saved, and the two application panes can be assembled with the cover pane in a shorter time interval into an insulating glass element with three panes.

27 Claims, 6 Drawing Sheets

(56) References Cited

U.S. PATENT DOCUMENTS

| | | | |
|---|---|---|---|
| 5,676,782 A | 10/1997 | Lisec | |
| 5,685,437 A | 11/1997 | Lisec | |
| 6,077,018 A | 6/2000 | Lisec | |
| 6,378,586 B1 | 4/2002 | Lafond | |
| 6,378,596 B1 | 4/2002 | Arrigotti et al. | |
| 2003/0178127 A1 | 9/2003 | Lisec | |
| 2005/0247392 A1 | 11/2005 | Lisec | |
| 2006/0076110 A1* | 4/2006 | Lisec | 156/361 |
| 2007/0074803 A1* | 4/2007 | Spotts et al. | 156/64 |
| 2008/0069682 A1 | 3/2008 | Schwetz et al. | |

FOREIGN PATENT DOCUMENTS

| | | |
|---|---|---|
| DE | 102 12 359 A1 | 10/2003 |
| DE | 103 50 312 A1 | 6/2005 |
| EP | 0176911 A1 | 4/1986 |
| EP | 0 603 148 A1 | 6/1994 |
| EP | 0 674 085 A | 9/1995 |
| EP | 0 674 086 A1 | 9/1995 |
| EP | 0 674 087 A | 9/1995 |
| EP | 0 704 389 A1 | 4/1996 |
| EP | 0 816 265 A2 | 1/1998 |
| RU | 2349529 C2 | 3/2009 |
| RU | 86183 U1 | 8/2009 |
| SU | 1454725 A1 | 1/1989 |

OTHER PUBLICATIONS

Russian Office Action, dated Aug. 23, 2013, from corresponding RU application.
Austrian Office Action, dated Aug. 25, 2010, from corresponding AT application.

* cited by examiner

DEVICE AND METHOD FOR APPLYING SPACER TAPES TO GLASS PANES

The invention relates to a device with the features of the preamble of claim 1. The invention also relates to a method for applying spacer tapes to glass panes.

Ordinarily, there are spacers between the glass panes of an insulating glass unit of aluminum or steel hollow sections, which encompasses two or more glass panes.

DE-A-30 02 904 discloses a spacer often called a "Swiggle-Strip" in the form of a tape with a rectangular cross-section that, provided with protective films, comes from a feed drum or reel and is applied to the glass pane by means of a device equipped with a turnable head ("application head"). Tape-like spacers based on butyl rubber are viscous-plastic, are highly adhesive (this is desirable for achieving a gas-tight connection initially to the first and later to the second glass pane of the insulating glass unit), but also have a highly temperature-dependent viscosity.

Recently, much less temperature-sensitive elastoplastic spacer tapes based on polyurethane or the like have been developed, which likewise have a rectangular cross-section, are more stable in shape and dimensions than the so-called "Swiggle-Strip," on the posterior outer side have a diffusion barrier, for example, a lining of aluminum foil, and—on the narrow sides that are designed for cementing to the glass panes—are provided by the manufacturer with a thin coating of a highly adhesive cement, which coating is covered with protective films until the tape is applied.

DE-A-102 12 359 discloses a method and a device for applying such a tape to at least one glass pane of an insulating glass unit consisting of at least two glass panes.

DE-A-103 50 312 discloses a device for producing insulating glass panes that has a device for applying an elastoplastic tape. This device for applying an elastoplastic tape as a spacer in the production of insulating glass panes comprises a feed reel for the tape, several driven tape guide rollers and a pressing head that can be moved relative to a glass pane for the tape. In contrast to the prior art, an elastoplastic tape is used whose side surfaces are not yet coated with a cement. Rather, it is applied only shortly before application of the tape to its two side surfaces. For this purpose, between the feed reel and the pressure head, there are nozzles opposite one another that coat the side surfaces of the tape with the cement.

Especially during the production of multi-pane insulating glass, thus insulating glass panes with three or more glass panes that are connected to one another by spacer tapes, it is not possible—with the known device—to work quickly and in a time-saving manner since spacers must be applied to the two panes in succession and only then is the insulating glass element possible for joining the application panes (=glass pane with applied spacer tape) and the cover pane (=glass pane without spacer tape).

Time could also often be saved in the production of two-pane insulating glass if several glass panes could be covered at the same time with spacer tapes.

Therefore, the object of the invention is to make available a device and a method of the initially named types with which the application of flexible, especially elastoplastic, spacer tapes to glass panes in the course of production of insulating glass panes is possible in less time and with less effort than in the past.

This object is achieved according to the invention with a device that has the features of claim 1.

The object is achieved, with respect to the method, by the independent claim aimed at the method.

Preferred and advantageous embodiments of the invention are the subject matter of the dependent claims.

Because, in the device according to the invention, more than one application head is provided, two glass panes can be covered at the same time with spacer tape. Therefore, flexible spacer tapes can be applied in a time-saving manner.

In particular, when glass panes that have identical outline shapes of the same size can be covered with spacer tapes using the device according to the invention, one embodiment of the invention in which the application heads of the device according to the invention can be moved synchronously has proven its value.

In particular, the invention for producing three-pane insulating glass allows a method to be used that works, for example, as follows: The first pane (cover pane) enters the unit and is conveyed through the unit without a spacer tape being applied to it. Thereupon, the second glass pane, i.e., a glass pane to which a spacer tape is to be applied (1st application pane), is moved to the application head that is the second one with respect to the conveyor direction, is grasped there by a holding means, for example by suction, measured, and moved on the holding means into the application starting position.

As soon as this has happened or, if possible, overlapping in time, a third glass pane (2nd application pane) is moved to the application head that is the first one with respect to the conveyor direction, is grasped there by another holding means that is provided there, and moved into the position for the start of the application. As soon as this has happened, the two application heads are set into motion and by combined motion of the glass panes on the one hand (preferably in the horizontal direction) and the application heads in a direction perpendicular thereto (preferably essentially vertically up and down) on the other hand, one spacer tape at a time is applied to the edge of the two glass panes.

Because the size of the first application pane is measured in the region of the outlet-side application head using a means for measuring the glass pane, the control of the movements of the application heads on the one hand and the glass panes (by the holding means that are assigned to it) on the other hand can take place such that the spacer tape is applied at the desired distance from the outer edge of the glass pane.

In one advantageous embodiment, a buffer storage is connected downstream from the device according to the invention following a means for closing the initially still open corner in the spacer and in front of a downstream press, especially a press in which insulating glass elements are filled with gas. This buffer storage that, for example, has six compartments for glass panes makes it possible to equalize the different working cycles and procedures between the device according to the invention and the (gas-filling) press. The press, especially the gas-filling press, can be made with one or two movable press plates and otherwise can be built and can operate in this way (similarly), as is known from EP 0 603 148 A, EP 0 674 085 A, EP 0 674 086 A or EP 0 674 087 A.

The buffer storage can be made and operated as is known in the art from EP 0 816 265 A or EP 0 704 389 A.

Other details and features of the invention will become apparent from the following description of one embodiment of the device according to the invention based on the drawings.

Here:

Figure 3:
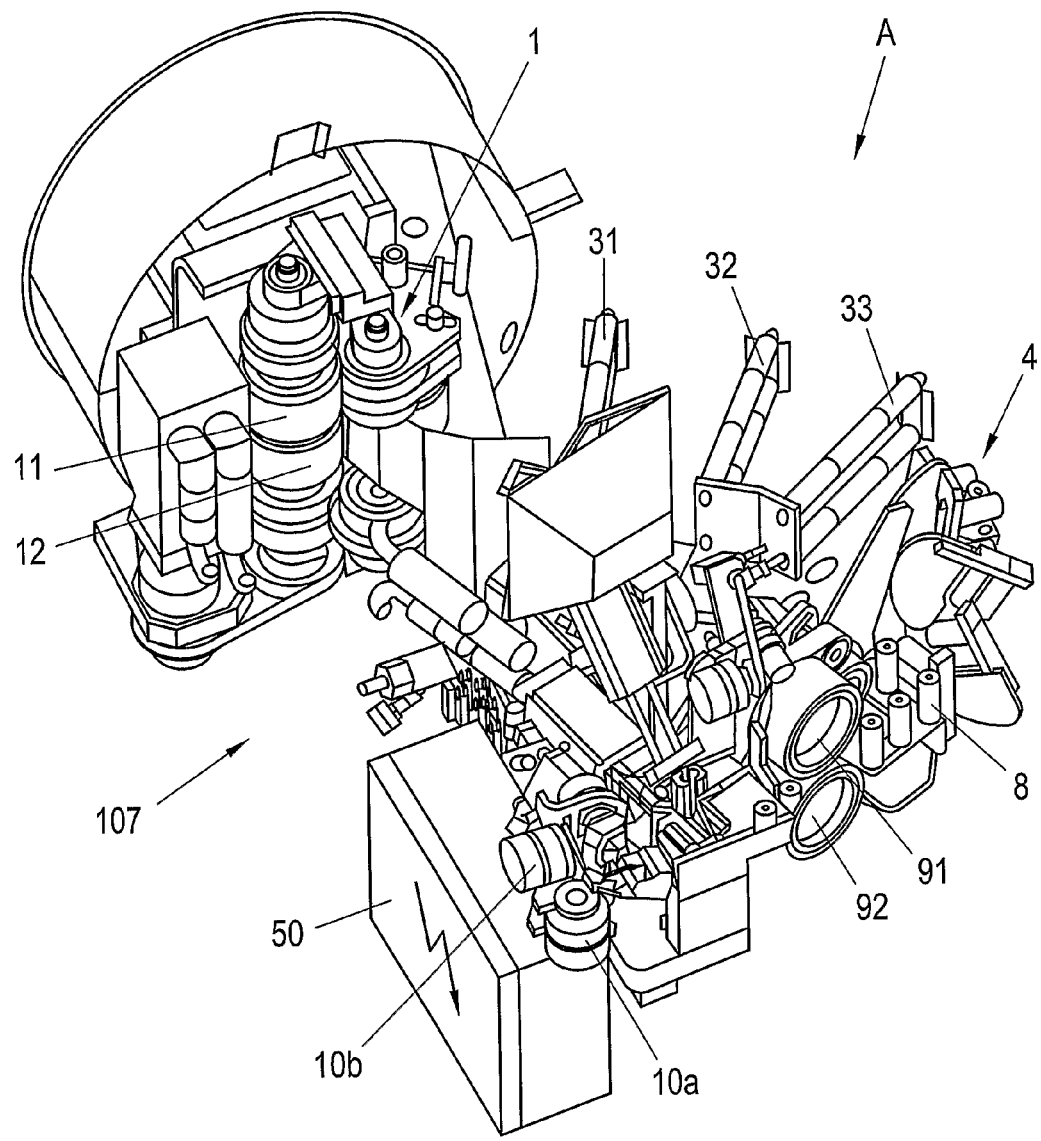
Figure 4:
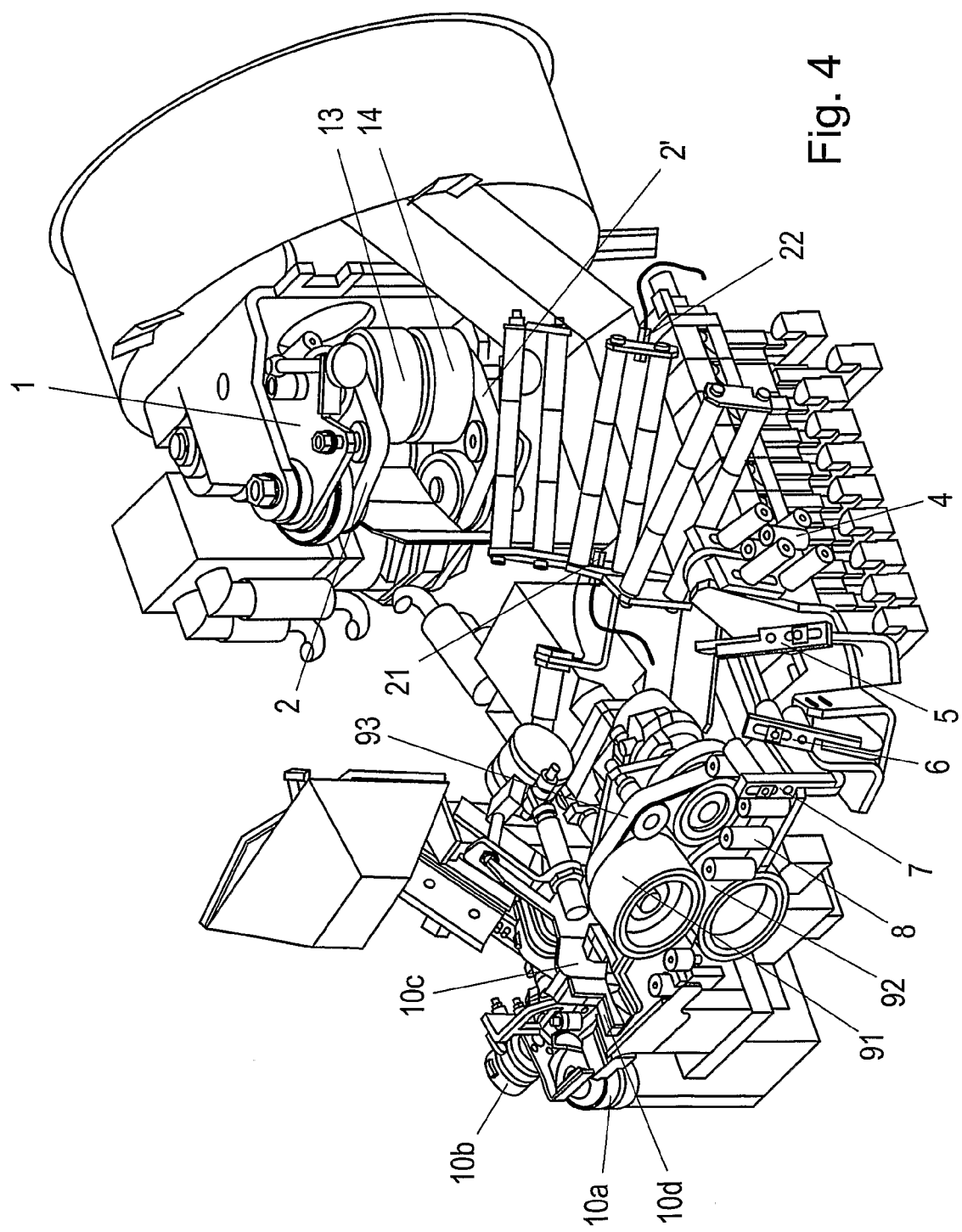
Figure 5:
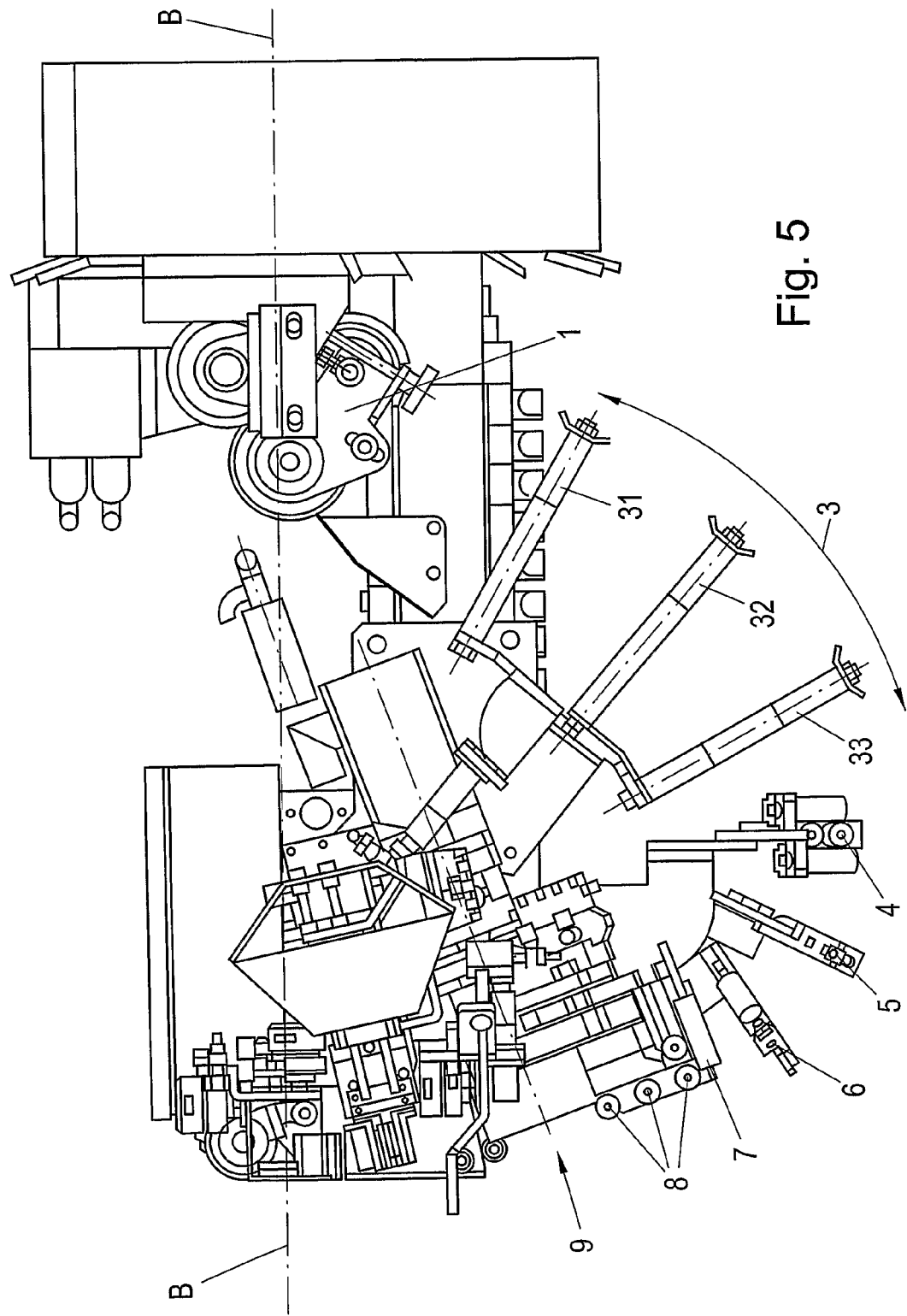
Figure 6:
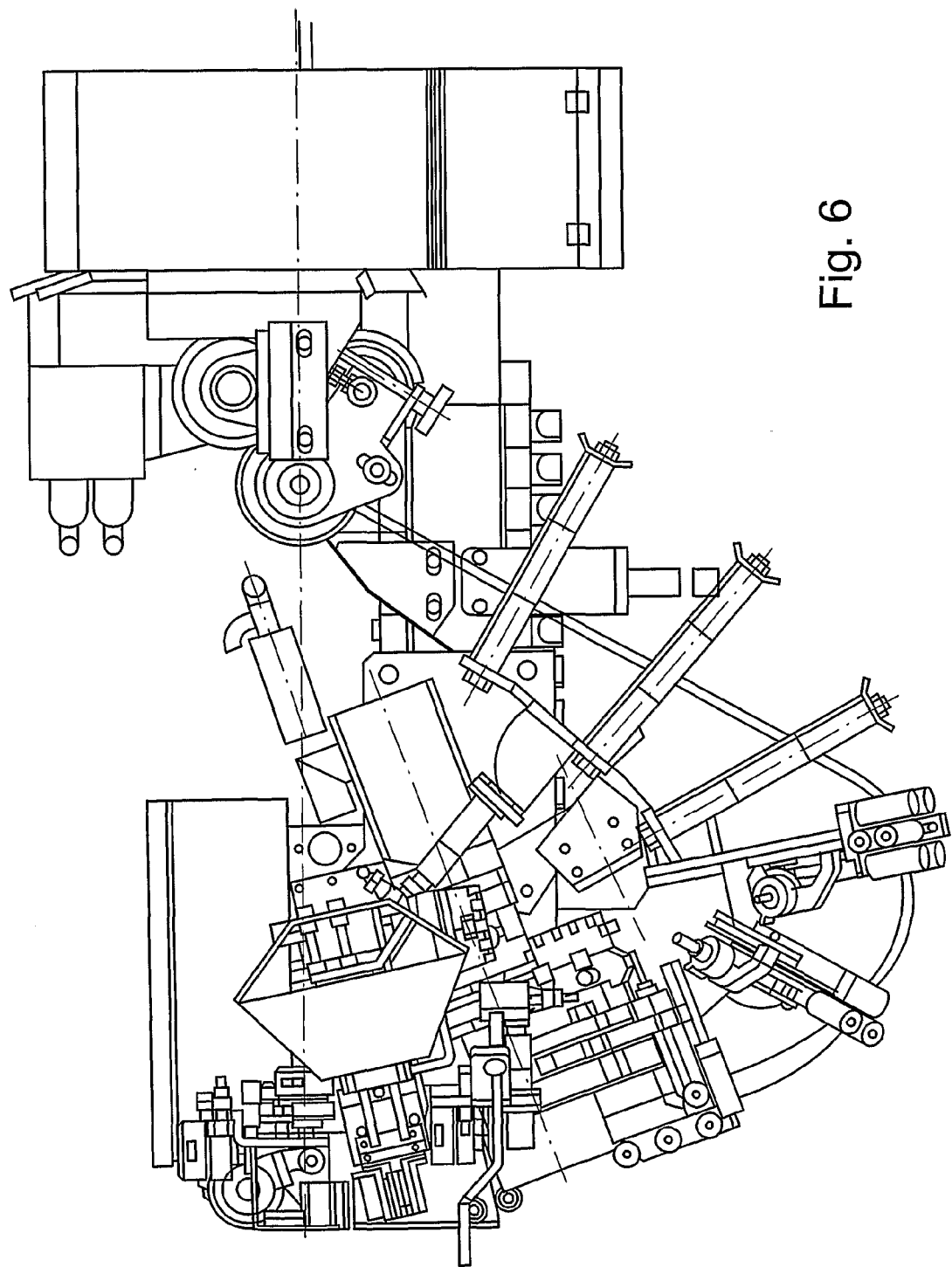
Figure 7:
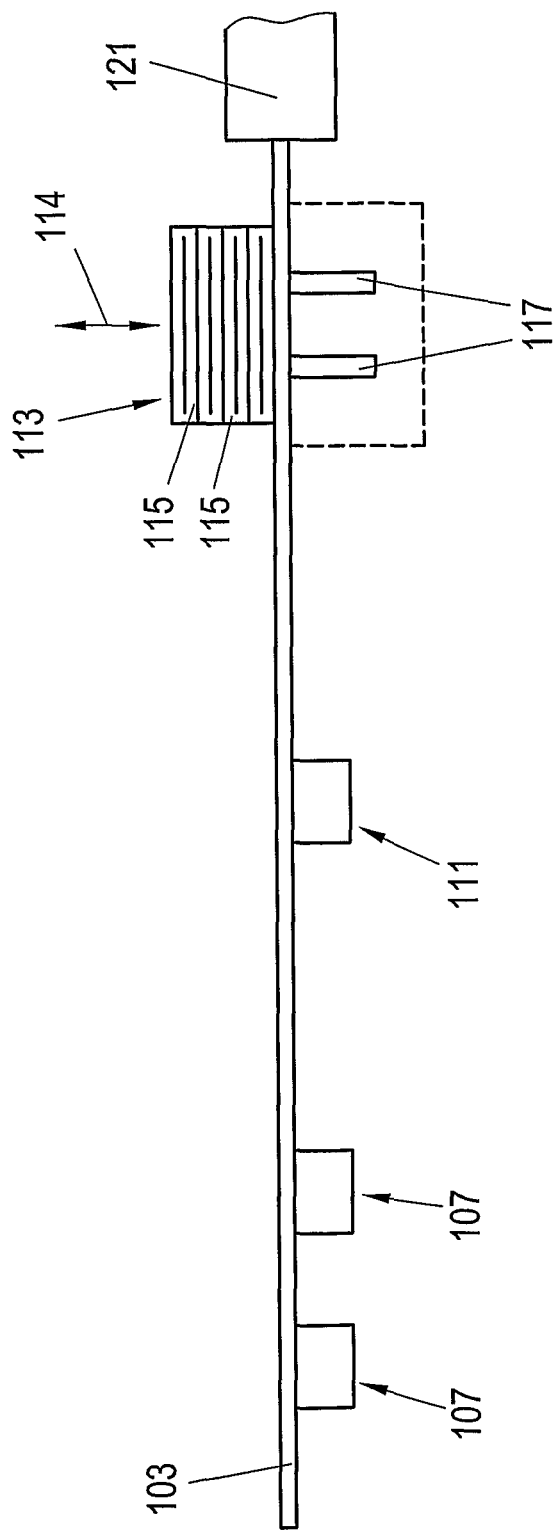

FIG. 3 shows a perspective view of an application head of a device for applying an elastoplastic spacer tape, which head is known from DE 102 12 359 A, FIG. 4 shows the same application head, viewed approximately from direction "A" in FIG. 3, FIG. 5 shows a somewhat simplified top view, corresponding to FIG. 4, FIG. 6 shows an oblique top view with tape, and FIG. 7 shows, highly simplified, a means with downstream unit parts.

Figure 1:
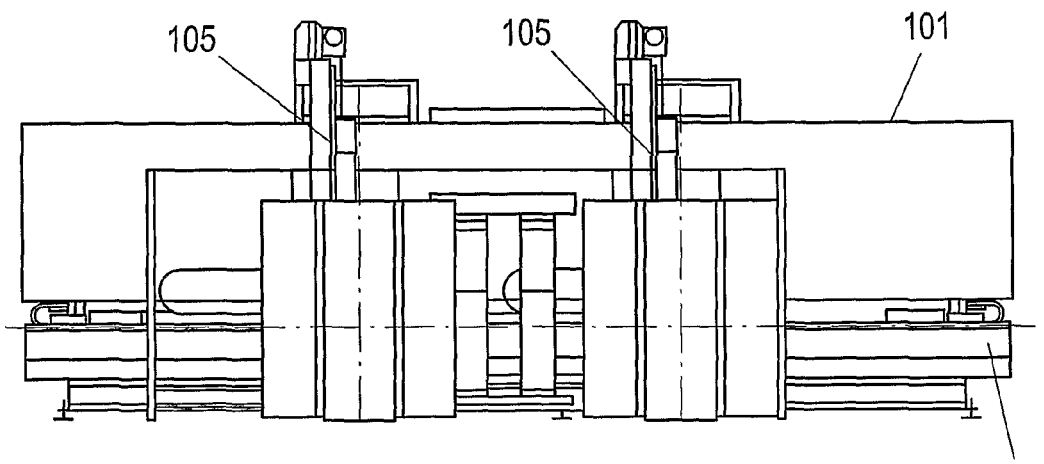
FIG. 1 shows a means according to the invention in front view.
Figure 2:
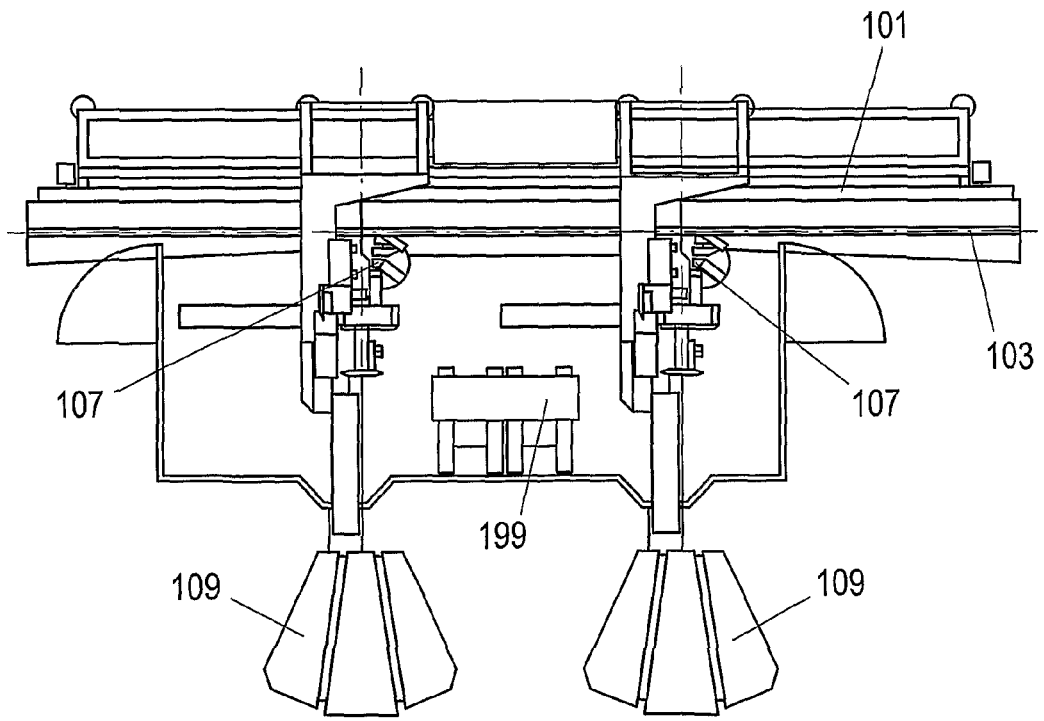
FIG. 2 shows a top view of the unit from FIG. 1.

The sample embodiment of a device for application of (elastoplastic) spacer tapes to glass panes, which is shown in FIGS. 1 and 2, in the course of producing multi-pane insulating glass, in the embodiment three-pane insulating glass, has the following fundamental structure.

The device comprises an essentially vertically aligned support wall 101—on which the glass panes are held—that is tilted vertically to the rear and in the normal case by a few degrees, for example 5°. The support wall 101 can be a roller wall, an air cushion wall, or simply a wall with a sliding surface.

On the lower edge of the support wall 101, there is a linear conveyor 103 that can have any embodiment and, for example, can have a series of rollers or conveyor belts. It is also conceivable and advantageous under certain circumstances if the linear conveyor 103 is divided into several conveyor sections.

In the lower region of the support wall 101, especially barely above the linear conveyor 103, there are holding devices for glass panes that are to be covered with spacer tape. These holding devices are especially also set up to move the held glass pane horizontally, therefore transversely to the direction of motion of the application heads 107. For this purpose, the holding devices are equipped with, for example, suction heads, negative pressure conveyor belts or the like.

At a distance in front of the support wall 101 and parallel to the latter, there are linear guides 105 (vertical axes) aligned in the vertical plane for two application heads 107 via which (elastoplastic) spacer tapes can be applied to glass panes.

Spacer tapes are supplied to the application heads 107 from the feed drums that are accommodated in housings 109. Here, the housings 109 can be climate-controlled; therefore, they can be made as climate-control boxes. The spacer tapes can be supplied to the application heads, for example, such as is known in the art from DE-A-103 50 312.

In the embodiment shown, between the two application heads 107, there is a supply unit 199 for butyl rubber-based cement, the two application heads 107 supplied with cement so that cement can be applied (sprayed on) to the side surfaces of the spacer tape using nozzles that are provided in the application heads 107.

The constructions of the application heads 107 and the means in which there are feed drums can have essentially a structure that corresponds to the application heads that are disclosed in DE-A-102 12 359.

This construction is described below based on FIGS. 3 to 6, which correspond to FIGS. 1 to 4 of DE-A-102 12 359.

The application head 107 that can be turned in steps in the manner that is known in the art around the axis B-B in FIG. 5 for travelling along the generally four side edges of a glass pane in the direction of the tape transport from a feed drum, not shown, to the application site comprises the following parts that are critical to operation in this connection:

A first tape transport 1 is adjustably driven via a machine control 50 and two toothed belts 2, 2' (compare FIG. 4) and comprises four rollers 11, 12, 13, 14, of which the roller pairs 11 and 13 as well as 12 and 14 interact in each case and are optimally designed for tapes of different width. The tape is supplied without tension to the tape transport 1 upright or edgewise from the feed drum that is not shown (in the housing 109). For this purpose, the feed drum is provided with a take-off drive that is controlled via the machine control.

The tape transport 1 is connected to a compensation segment 3 that is routed in an arc (compare FIG. 5) in which the tape is routed between slot-shaped guides consisting of three guide and support roller pairs 31, 32, 33 such that it can deflect transversely to its transport direction in the side plane, but not in the vertical plane.

The compensation segment 3 ends on a tape guide 4 that encompasses six rollers and that are followed by three roller pairs 5, 6, and 7 that turn the belt by 90° into a "horizontal" orientation. Other rollers 8 take over lateral guidance.

Then, the tape runs into a second tape transport 9 that comprises two interacting rollers 91 and 92 that are driven in a controllable manner by the machine control via a toothed belt 93.

The second tape transport 9 supplies the tape to the actual application site. The latter, in addition to the conventional pressing rollers 10a (for the horizontal legs of the posterior frame) and 10b (for the vertical legs of the posterior frame), comprises the likewise conventional means that are therefore not explained in detail for punching out the mitering wedges at the sites at which the application head is turned to form a corner, and a lever 10c with a tape support 10d (compare FIG. 4). The lever 10c is pivotable and supports the belt in a repeated outage, especially when approaching a corner to be formed and/or before, during and after cutting off the tape at the end of following the contour of the glass pane to produce a closed spacer frame.

In the compensation segment 3, specifically on the narrow sides of the guide slot bordered by the roller pair 32, there is a first sensor 21 on the inside of the arc and there is a second sensor 22 on the outside of the arc. The sensors 21, 22 that can be, for example, reflection photoelectric barriers are connected to the machine control, and when the tape approaches, deliver a signal. If the tape approaches the sensor 21 as a result of undersupply by the tape transport 1 relative to the peripheral speed of the tape transport 9 that is determined by the instantaneous application speed, then the machine control slightly increases the driving rpm on its signal and thus the peripheral speed of the corresponding roller pair 11, 13 (or 12, 14) of the tape transport 1, and thus prevents a tensile stress from being applied to the tape. If, conversely, the tape approaches the sensor 22 on the outside of the arc as a result of oversupply by the tape transport 1, the latter delivers the corresponding signal to the machine control that thereupon slightly reduces the peripheral speed of the corresponding roller pair of the tape transport 1 and thus prevents the tape from being rolled on edge in front of the tape transport 9 and being applied in this state.

The cycle time is improved especially for producing the triple insulating glass elements by the device according to the invention and by the method according to the invention since two glass panes can be covered at the same time with spacer tape. Another advantage consists in an embodiment in that a (single) butyl supply unit 199 for the two application heads 107 is necessary.

Furthermore, the device according to the invention makes it possible to keep up to eight different spacers in the supply stations (climate-control boxes—housing 109) of the device so that the changing times are shortened when the spacer tapes change, or when other intermediate air spaces are desired between the glass panes.

The device according to the invention also allows application of spacer tapes with different dimensions, especially widths, synchronously or asynchronously to the two application panes; this is necessary or desirable for three-pane insulating glass units with intermediate air spaces of different thicknesses.

It is also advantageous in the device according to the invention that there are separate safety zones; this is advantageous for maintenance, cleaning and fault-tolerance.

In a simplified schematic plan view, FIG. 7 shows one part of a unit for producing insulating glass with a device according to the invention with two application heads 107, the linear conveyor 103, a station 111 for sealing the corners in the spacer tape that has been applied to a glass pane, a buffer storage 113 with compartments 115 and a press 121, for example a gas filling press with two movable press plates.

The buffer storage 113 can be transversely adjusted (arrow 114) on rails 117 for alignment of the compartments 115.

Cover panes and glass panes to which the spacer tape is applied as spacers ("application panes") are conveyed by the linear conveyor 103 to the buffer storage 113 and buffered in compartments 115 thereof until they are moved depending on the requirement and in the correct sequence from the buffer storage 113 into the press 121.

The buffer storage 113 also makes it possible to move glass panes back onto the linear conveyor 103; this can be necessary if a pane of a package that goes together is lacking (for example because it is damaged and must be culled).

The buffer storage 113 can also be adjusted in such a way that the glass panes (especially large-format panes) can be conveyed past the buffer storage 113 directly into the press 121.

In summary, one embodiment of the invention can be described as follows:

A means for simultaneous application of elastoplastic spacer tapes to two glass panes with identical outline shape and identical dimensions has two application heads 107 that can be adjusted essentially vertically up and down on linear axles 105. The application heads 107 are moved synchronously, likewise the two glass panes, by the holding devices that are assigned to them and that move the glass panes in a direction that is perpendicular to the direction of motion of the application heads 107. Thus, it is sufficient to measure a single glass pane of a triple insulating glass element, and both application panes of the insulating glass element can be covered at the same time with spacer tapes so that time is saved and the two application panes can be assembled with the cover pane in a shorter time interval into an insulating glass element with three panes.

The invention claimed is:

1. Device for application of flexible spacer tapes to glass panes during production of insulating glass panes, the device comprising:
   plural synchronously adjustable application heads (107); and
   at least one feed drum for each of the spacer tapes assigned to the application heads (107), with the application heads (107) of one support wall (101) on which the glass panes are supported being arranged opposite.

2. Device according to claim 1, wherein the feed drums are arranged in climate-controlled housings (109).

3. Device according to claim 1, wherein the application heads (107) are adjustably guided on vertically aligned linear guides (105) that are parallel to a plane of the support wall (101).

4. Device according to claim 1, wherein the application heads (107) are set up for simultaneous application of the spacer tapes to at least two of the glass panes.

5. Device according to claim 1, wherein a means for measuring the glass panes to which the spacer tapes are to be applied is assigned to the application heads (107).

6. Device according to claim 1, further comprising means (103) for linear conveyance of the glass panes and means for holding the glass panes on the support wall (101).

7. Device according to claim 6, wherein the means (103) for linear conveyance is selected from the group comprising a series of transport rollers and at least one conveyor belt.

8. Device according to claim 6, wherein a said means for holding the glass pane is assigned to each said application head (107).

9. Device according to claim 6, wherein the means for holding the glass panes has at least one suction head or suction belt conveyor that is adjustable parallel to the means for linear conveyance (103).

10. Device according to claim 1, further comprising plural feed drums for different said spacer tapes that are assigned to each said application head (107).

11. Device according to one claim 1, wherein the application heads (107) are arranged to be synchronously adjusted.

12. Device according to claim 1, wherein a common means (199) for preparation and supply of cement that is to be applied to the spacer tapes is assigned to the application heads (107).

13. Device according to claim 12, wherein the means (199) is set up for supplying butyl rubber-based cement.

14. Device according to claim 12, wherein the means (199) supplies the cement to nozzles provided in the application heads (107) and is set up for applying the cement to side surfaces of the spacer tapes.

15. Device according to claim 8, wherein the means for holding the glass panes is adjustable transversely to a direction in which the application heads (107) can be adjusted.

16. Device according to claim 15, wherein the means for holding the glass panes are synchronously adjustable.

17. Unit for producing insulating glass, comprising the device for applying spacer tapes according to claim 1, and a buffer storage (113) that is arranged between the device for applying spacer tapes and a downstream press for assembly and pressing of the insulating glass panes.

18. Unit according to claim 17, wherein the device for applying spacer tapes comprises a linear conveyor (103) and wherein the buffer storage (113) has several storage compartments (115) and is adjustable adjusted transversely to the linear conveyor (103).

19. Method for application of spacer tapes to glass panes in the course of production of insulating glass panes, the method comprising:
   adjusting at least two synchronously adjustable application heads at the same time;
   supplying the spacer tapes to the application heads from assigned feed drums; and
   applying the spacer tapes at the same time to two of the glass panes as spacers.

20. Method according to claim 19, wherein the spacer tapes are applied to two of the glass panes of the same size by synchronous movement of one of the application heads and the glass panes.

21. Method according to claim 19, wherein before applying the spacer tapes, the size of the glass panes to which the spacer tapes are to be applied is measured, and dimensions of the measured glass panes are supplied to a control for the application heads.

22. Method according to claim 19, wherein to produce triple pane insulating glass, a first pane is conveyed without application of the spacer tape, a second glass pane is moved to the application head that is second relative to a conveyor direction, a third glass pane is moved to the application head that is first relative to the conveyor direction, and these two application heads are set into motion, and wherein by combined motion of the glass panes, and the application heads, one said spacer tape in each case is applied to the edge of the two glass panes as a spacer.

23. Method according to claim 22, wherein dimensions of the first glass pane are detected and wherein the detected size of the first glass pane is supplied to a control of the two application heads.

24. Method according to claim 22, wherein the two application heads apply the spacer tape synchronously and at the same time to the second and third glass panes.

25. Method according to claim 22, wherein the spacer tapes with different dimensions are applied to the second and third glass panes by the application heads.

26. Method according to claim 19, wherein both the first glass pane and the second and third glass panes —each covered with spacer tape before assembly of the triple insulating glass pane —are intermediately stored in a buffer storage, and they are moved out of the buffer storage into a a press for assembly of the insulating glass.

27. Method according to claim 19, wherein in the application of the spacer tape, the glass panes are moved back and forth horizontally, and wherein the application heads are moved up and down such that the spacer tape is applied along edges of each of the two glass panes by the combined movements.

* * * * *